United States Patent [19]

Voles

[11] Patent Number: 4,898,032
[45] Date of Patent: Feb. 6, 1990

[54] RATE SENSOR

[75] Inventor: Roger Voles, London, England

[73] Assignee: Thorn EMI Electronics Limited, Hayes, England

[21] Appl. No.: 216,212

[22] Filed: Jul. 6, 1988

[30] Foreign Application Priority Data

Jul. 8, 1987 [GB] United Kingdom ............. 8716047

[51] Int. Cl.⁴ .................................................. G01P 15/00
[52] U.S. Cl. ..................................................... 73/505
[58] Field of Search ....................... 73/505, 510; 329/50

[56] References Cited

U.S. PATENT DOCUMENTS

| 3,789,673 | 2/1974 | Berlin et al. | 73/505 |
|---|---|---|---|
| 4,511,848 | 4/1985 | Watson | 329/50 |
| 4,524,619 | 6/1985 | Staudte | 73/505 |
| 4,538,461 | 9/1985 | Juptner et al. | 73/505 |
| 4,654,663 | 3/1987 | Alsenz et al. | 73/505 |
| 4,665,748 | 5/1987 | Peters | 73/505 |
| 4,791,815 | 12/1988 | Yamaguchi et al. | 73/505 |

FOREIGN PATENT DOCUMENTS

| 131283 | 10/1946 | Austria | 73/505 |
|---|---|---|---|
| 60-185111 | 9/1985 | Japan | 73/505 |

Primary Examiner—John Chapman
Assistant Examiner—Robert P. Bell
Attorney, Agent, or Firm—Fleit, Jacobson, Cohn, Price, Holman & Stern

[57] ABSTRACT

An angular rate sensor comprises a pair of driven tines and a pair of output tines connected to the driven tines by a stem portion. A detection circuit including a set of output electrodes, associated with each output tines, generates a detection signal related to angular rate. A feedback circuit, including a further set of electrodes associated with each driven tine; utilizes a phase quadrature component of the detection signal so as to drive the driven tines towards a condition of torsional balance.

12 Claims, 3 Drawing Sheets

DRIVEN FORK

DRIVEN FORK

RATE SENSOR

The present invention relates to an angular rate sensor device.

The present invention concerns a development and improvement in the technology described in U.S. Patent Specification Nos. 4,524,619, 4,538,461 and 4,654,663 and by this reference the subject-matter contained in these documents is incorporated within the disclosure of the present invention.

U.S. Pat. No. 4,524,619, for example, describes an angular rate sensor which is illustrated in FIG. 1a of the accompanying drawings. The sensor comprises a resonant structure 10 mounted on a rectangular quartz frame 11 by a pair of suspension bridges 12, 13. The resonant structure comprises two pairs of tines, namely a driven pair 14, 15 and a detection pair 16, 17, and the two pairs are interconnected by a stem or base 18. Each tine of the driven pair has an associated set of electrodes, as illustrated in FIG. 1b of the drawings. The driven pair is energised by a suitable drive oscillator 20 and is effective to excite a flexural vibration in the XY plane shown in the drawings. If the sensor is subjected to angular rotation about the Y axis the resulting Coriolis force, which acts on base 18 in the Z direction, causes tines 16, 17 to vibrate in the YZ plane, the tines moving in antiphase, and that vibration is sensed by a set of output electrodes 21, as illustrated in FIG. 1c.

Taking the technology disclosed in the above U.S. Patent Specifications, if the driven tines are unbalanced in the sense that their tips move in parallel planes (rather than in the same plane), a condition referred to hereinafter as torsional imbalance, and if the separation between these planes is $2\tau$, then a component of the detected signal will be in phase-quadrature with the Coriolis signal. The ratio of the magnitude of this phase-quadrature component to that of the Coriolis signal is $$\rho = \tfrac{1}{2} \frac{\omega}{\Omega} \frac{\tau}{R} \qquad (1)$$

where $\omega$ is the angular frequency of the drive, $\Omega$ is the spin rate to be sensed and $2R$ is the separation between the tines.

In principle, the quadrature component can be rejected in favour of the required in-phase component. In practice, however, there is an upper limit to $\rho$ achievable in any reasonably economical manner. For a simple circuit particularly suited to use in the angular rate sensor, a figure of $\rho = 100 \equiv 40$ dB will be assumed.

With this prescribed limit for $\rho$, eqn (1) defines the lower limit of $\Omega$ that can be measured in terms of the imbalance measure, $\rho$.

Taking (as indicated by U.S. Patent Specification No. 4,524,619) R to be 380 $\mu$m, the thickness of the tines to be 500 $\mu$m, the frequency of the driven fork to be 12 kHz, and the lower threshold of sensitivity due to torsional imbalance ($\Omega$) to be 0.5°/s and inserting these figures into eqn (1), gives $$\tau = 2 \frac{\Omega}{\omega} R\rho = 8.8 \text{ nm}$$

Expressed as a fraction of the tine thickness, this is 1.8 $10^{-3}$%.

In the above arrangement, the quadrature output is rejected by means of a 40 dB phase discriminator. An alternative, more elaborate approach is to back-off the quadrature signal (prior to this phase discriminator) by means of an electronic feedback loop. To do this, a quadrature phase discriminator is required—operating in parallel with the in-phase discriminator extracting the Coriolis signal. By this means, the level of the residual quadrature output (at the input to the in-phase discriminator) can be reduced by the factor of, say, $1000 \equiv 60$ dB. This, in turn, can relax the constraint on $\tau$ by the same factor. Thus, for $\Omega \geq 0.5°$/sec, $\tau$ must be no greater than 8.8 $\mu$m (1.8% of tine thickness) and for $\Omega \geq 0.1°$/sec must be no more than 1.8 $\mu$m (0.36% of tine thickness).

To generalise, if the overall quadrature rejection ratio provided by the output circuit (obtained by any means) is $\rho_q$ and the corresponding "threshold" spin rate is $\Omega_q$ then the corresponding maximum imbalance distance $$\hat{\tau} = 2\frac{R}{\omega} \frac{\rho_q}{\Omega_q}$$

Graphs of $\hat{\tau}$ as a function of $\rho_q$ for relevant values of $\Omega_q$ re given in FIG. 2.

Thus, torsional imbalance in the driven fork produces a quadrature output which sets a lower limit to the level of the required in-phase Coriolis signal that can be sensed. This lower level is inversely dependent on the quadrature rejection ratio provided by the associated electronic circuitry. In general terms, if the rejection ratio is $\rho$, then the system is able to function accurately down to angular rates where the quadrature signal is $\rho$ times the Coriolis signal. Even with very careful circuit design and tolerancing, it is unlikely that $\rho$ can be made greater than about 100 dB.

It is therefore an object of the present invention to provide an angular rate sensor which alleviates at least some of the aforementioned problems.

According to the present invention there is provided an angular rate sensor comprising a pair of driven tines and excitation means, responsive to an applied drive signal, for exciting a vibration of the driven tines; a pair of output tines, coupled mechanically to the driven tines; and detection means responsive to a vibration of the output tines for generating a detection signal related to angular rate, and feedback means for driving the driven tines towards a condition of torsional balance, the feedback means being responsive to a feedback signal related to torsional imbalance of the driven tines.

Said feedback signal may be related to, and derived from, a phase-quadrature component of said detection signal.

In order that the invention may be carried readily into effect embodiments are now described, by way of example only, by reference to the accompanying drawings of which:

FIG. 1a illustrates a known angular rate sensor described in U.S. Pat. No. 4,524,619;

FIGS. 1b and 1c illustrate electrode arrangements associated with the driven tines and the output tines respectively of the sensor illustrated in FIG. 1a;

Figure 1A:
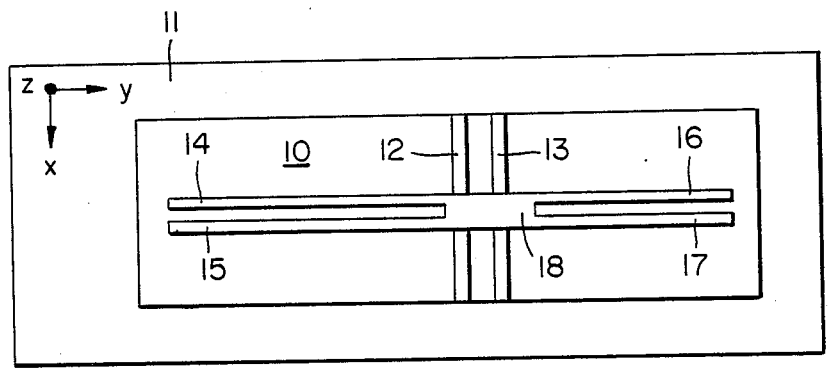
Figure 1B:
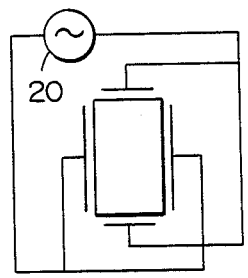
Figure 3A:
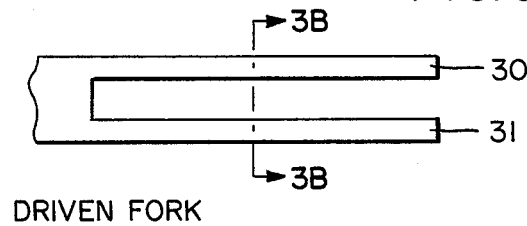
FIG. 3 illustrates a feedback arrangement in accordance with the present invention.
Figure 3B:
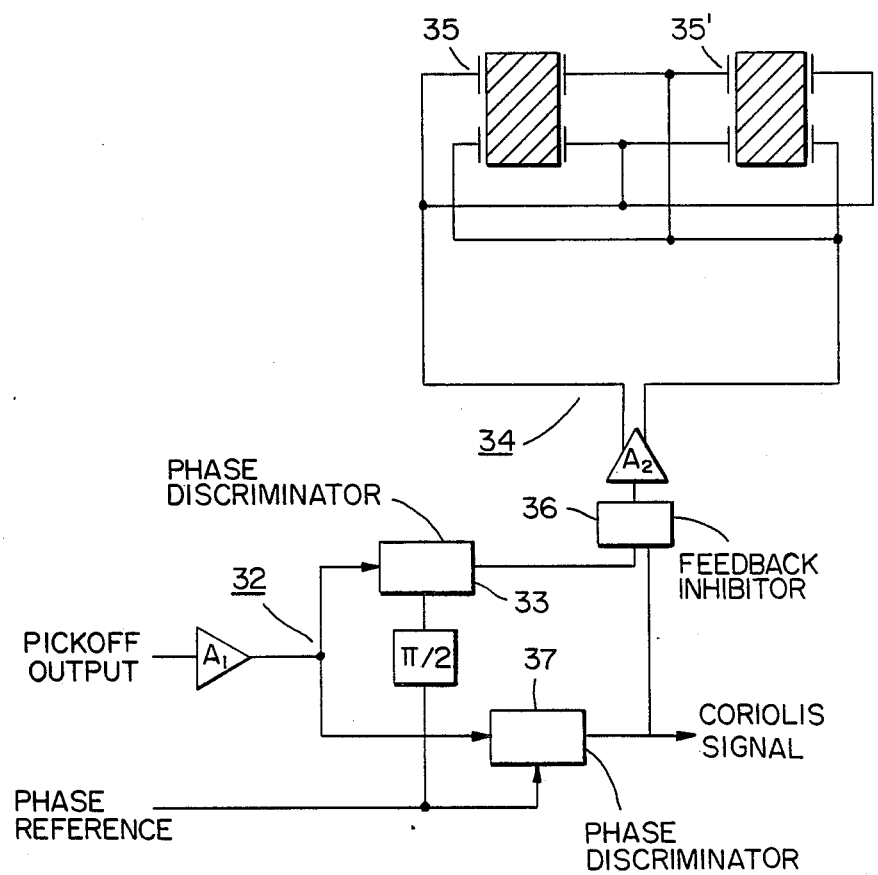

FIG. 3 of the drawings shows a cross-sectional view through the driven tines 30, 31 of an angular rate sensor which is similar to that shown in FIG. 1a. As in the case of that known sensor, each driven tine is provided with a set of driving electrodes (not shown in FIG. 3) having the same configuration as the electrode sets shown in FIG. 1b, and each output tine is provided with a set of output electrodes having the same configuration as the electrode sets shown in FIG. 1c.

In this embodiment of the invention, there is provided, in addition, an auxillary circuit 32 which includes a phase quadrature detector 33 and is effective to sense a phase quadrature component of the detected pickoff, output signal derived from the output electrodes associated with the output tines and amplified by amplifier $A_1$. A phase quadrature component, sensed by phase sensitive detector 33, is utilised in a feedback circuit 34 to twist the driven tines back towards a conditional of torsional balance and thereby null any imbalance distance $\tau$.

Figure 1C:
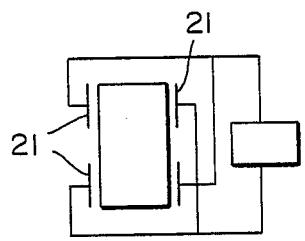
Figure 2:
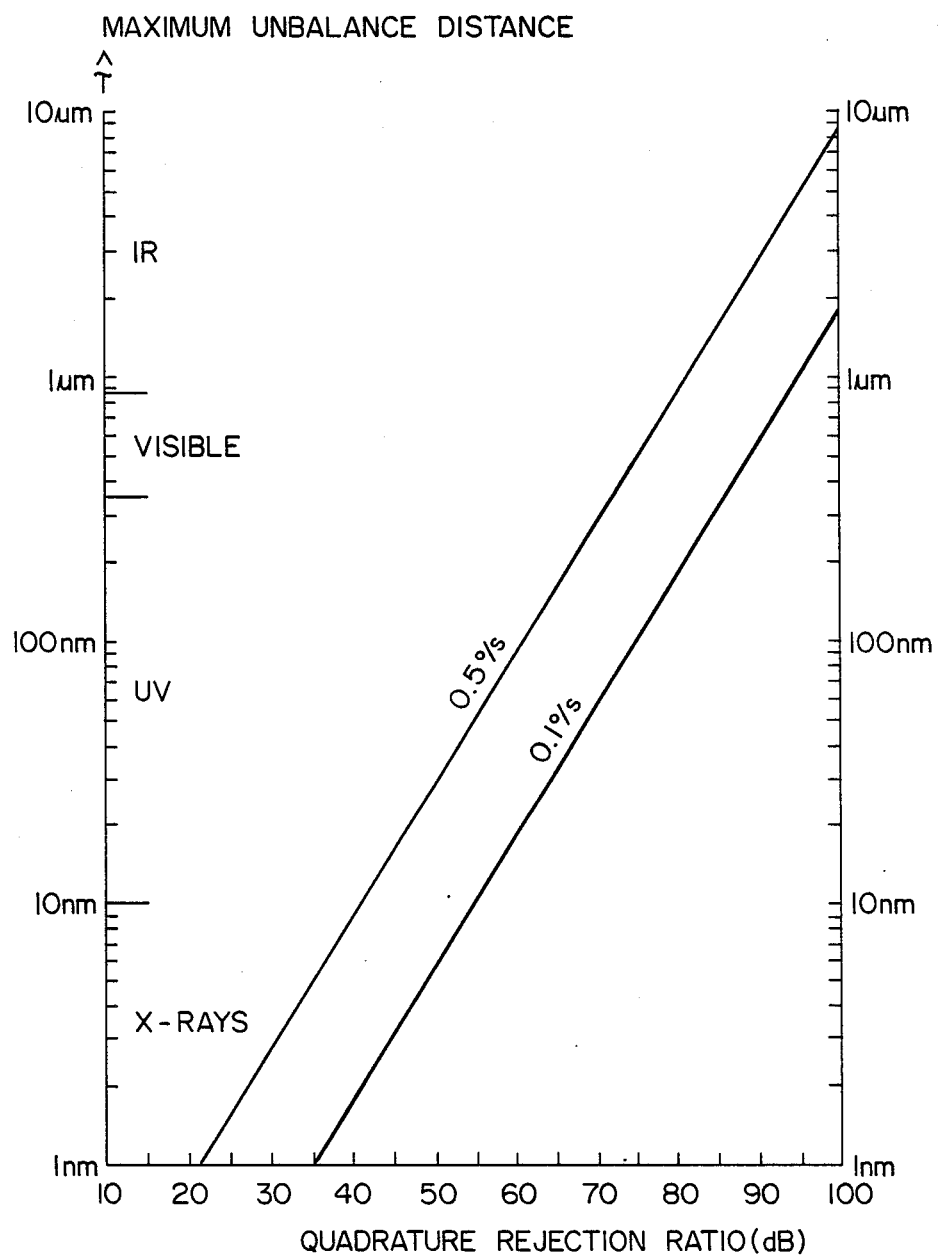
FIG. 2 illustrates the relationship of maximum imbalance distance $\hat{\tau}$ as a function of $\rho_q$ for different values of $\Omega$; q

To that end, the feedback circuit includes an additional set of electrodes 35, 35' associated with each driven tine and which, in terms of position, design and electrical connection, has the same configuration as that shown in FIG. 1c and described in U.S. Pat. No. 4,524,619. In this arrangement, the electrodes 35, 35' are driven, by means of amplifier $A_2$, with a "dc" signal to deflect the driven tines in the plane normal to their plane of vibration. Insofar as this is included in a feedback loop, the system seeks to drive $\tau$ to zero and hence eliminate the unbalance quadrature output at source.

At spin rates greater than that at which the Coriolis signal is comparable to the inherent imbalance, phase-quadrature output, nulling of $\tau$ is not required. Insofar as the extraction of the quadrature output is progressively more onerous as the spin increases, a simpler solution is to dis-enable the new feedback circuit 34, by means of inhibit circuit 36, whenever the Coriolis signal is greater than, say, ten times the quadrature output that could be produced by the inherent maximum design tolerance for $\tau$ in the driven fork.

Insofar as the balancing-loop need do no more than maintain the residual unbalance to the level where the quadrature output is no more than, e.g. one-tenth of the Coriolis signal, the required rejection ratios of the two phase discriminators 33, 37 are relatively modest (e.g. no more than about 20 dB).

Figure 4A:
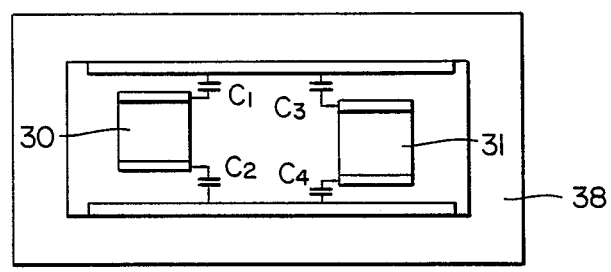
FIG. 4 illustrates a capacitive detector arrangement and associated capacitance bridge.
Figure 4B:
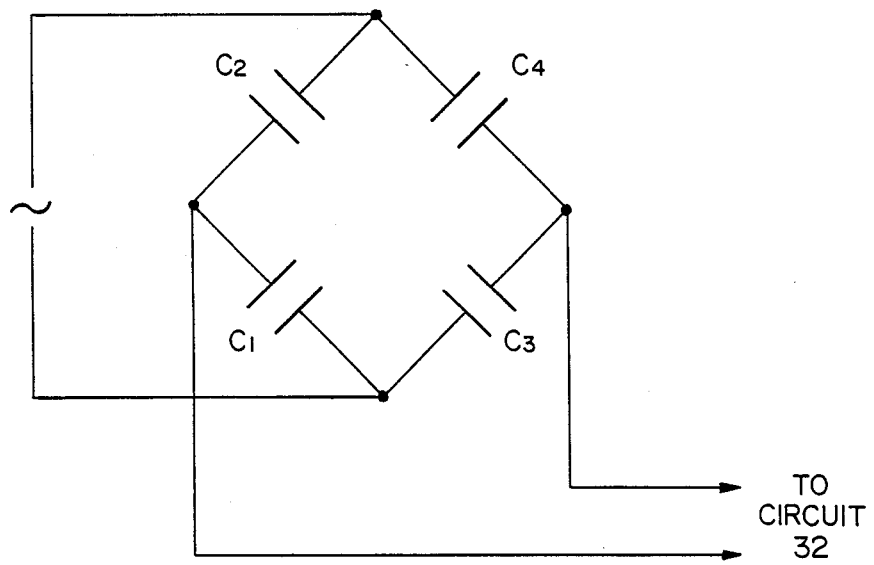

In an alternative form, there is provided means to sense capacitatively any imbalance for use in the feedback loop. Thus, there may be provision (e.g. a capacitance bridge) for sensing capacitatively the position of the driven tines 30, 31 in relation to a reference point, e.g. the sensor housing 38, and comparing the values for the two tines, as shown in FIG. 4, the resultant signal being used in the feedback circuitry.

Figure 5:
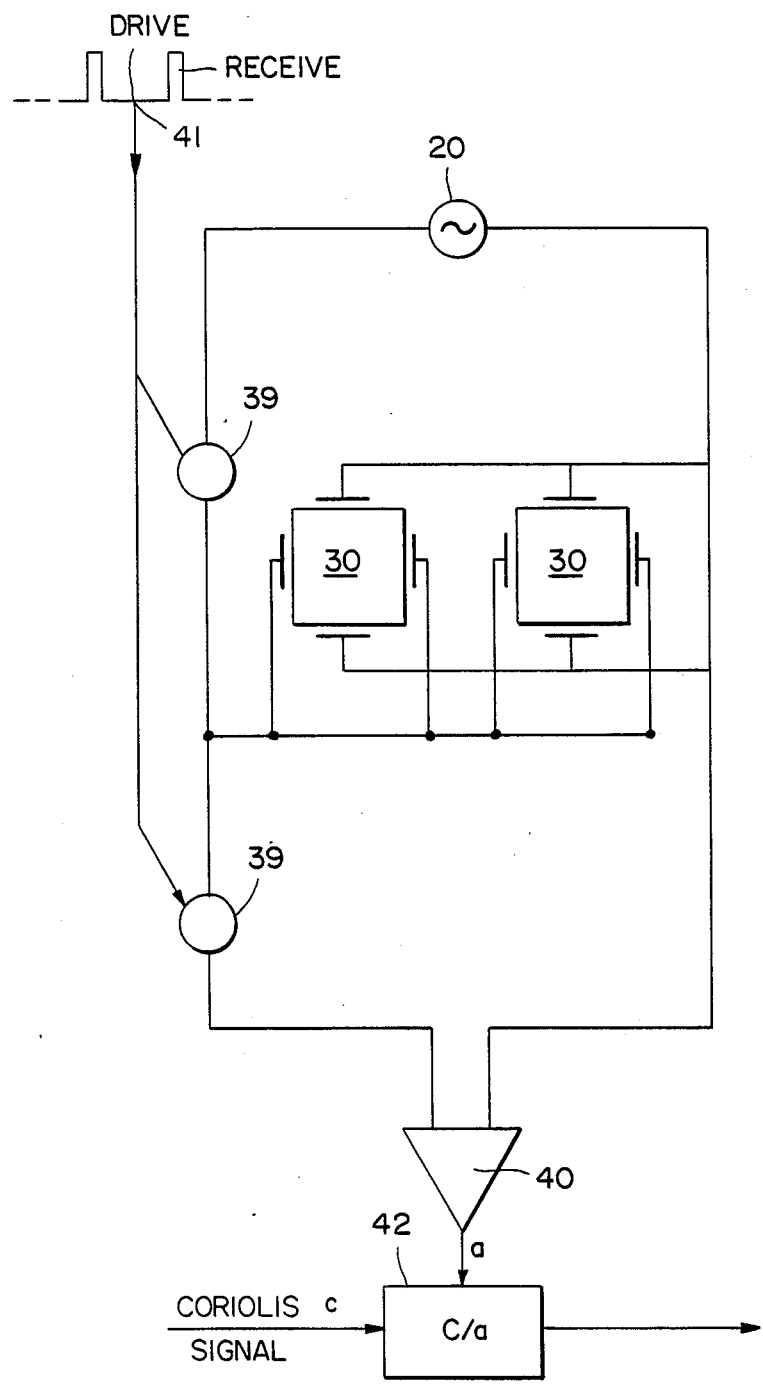
FIG. 5 illustrates a circuit arrangement for switching tines of the sensor between a drive mode and a receive mode so as to enable scaling of the output sensed by the sensor.

In a modification, the feedback loop incorporates the driven fork as well so that much earlier (albeit less accurate) outputs can usefully be obtained. To achieve this, the electrodes on the driven fork are switched by suitable switching means 39 from the output of the drive amplifier to the input of a new sense amplifier 40 at an adequately high switching frequency 41, as shown in FIG. 5. During the "receive" mode, the signals on the electrodes will be a measure of the amplitude of vibration of the driven fork and this corresponds directly to the "scale" of the output sensed by the original pick-off sensor.

The mode switch need not necessarily have a 1:1 mark-to-space ratio; generally, the drive mode would be several times longer than the receive mode as shown by the switching signal waveform 41 in FIG. 5.

The amplitude of the signal received from the driven fork is detected and then, at a divider circuit 42, used to divide the output from the detector channel in order to obtain the absolute spin rate. During the initial stages of build-up of the amplitude of the drive fork, noise and other errors in both channels corrupt the calculated measure of spin rate so that the overall error during the initial phases will be significantly higher than when the system has reached its final state. Nevertheless, the relatively crude measurements obtained by this means during the start-up phase are often preferable to the alternative of having to wait for the whole of the build-up time before any measurements are available at all.

If the Coriolis energy is transmitted from the driven fork to the pick-off fork by the bridge being flexed in an S-shaped manner out of the plane of the forks, then preferably the tines are placed much closer to the quarter-points of the bridge than as depicted in the U.S. Patent Specifications mentioned above.

If the Coriolis energy is transmitted to the pick-off fork as the result of the masses at the tips of the driven fork responding directly to the Coriolis forces that they generate, the tines of the driven fork are caused to oscillate in a plane perpendicular to the plane of the forks and this, in turn, causes the bridge to be twisted (as well as flexed). This twisting action can then be conveyed to the corresponding tines of the pick-off fork.

Insofar as it is stated in the prior art mentioned above that the bridge should be designed to resonate at the frequency of the driven fork, then preferably the bridge resonates at this frequency both in the flexural and in the torsional modes.

The tips of the driven fork are caused to oscillate in a plane perpendicular to the plane of the forks as the result of spin about the sensitive axis. Insofar as the flexure of the tines of the driven fork orthogonal to the plane of the forks can be detected by electrodes placed in exactly the same way as on the original pick-off fork, then optionally a pick-off fork can be omitted.

In the prior art mentioned above, the frequency of the pick-off fork is deliberately chosen to be some several hundred Hz away from the resonant frequency of the driven fork in order to make the system more responsive to changes in the spin to be measured. The same condition can be obtained by a suitable choice of thickness (out of the plane of the tuning fork) of the tines in conjunction with the possibly different elastic modulus in this direction as opposed to that appropriate to the fork in the driven mode. The output is now sensed using electrodes positioned to detect stress in the orthogonal direction to the driven mode. If interference between the drive signal and the pick-off circuit is difficult to avoid, then the switched drive-sense mode of operation could be used as described above.

With the single fork providing the sense signal as well, the structure is asymmetric. If this asymmetry proved to be undesirable (perhaps due to greater pick-up from external sources or other effects) then a truly symmetric arrangement could be obtained by simply using another fork lying in the same plane and mounted in a similar fashion to the prior art mentioned above. In this particular case, however, the two forks can be mechanically and electrically identical, the drive circuit being common. Providing that due account is taken of the relative phases of the output signals, the two forks could be driven either in-phase or in anti-phase. Insofar as the need for the second fork now arises solely in order to balance the system, there is basically no need to use it electrically at all—so that no electrodes need be mounted on it. Indeed, an adequate balance might be achieved simply by using a single tine lying on the axis of symmetry and having the same mass distribution with length as the fork on the other side of the bridge. Such a system still takes a certain time (perhaps in the order of one second) to work up to its working amplitude. The technique for measuring the amplitude achieved as described above can therefore be used.

I claim:

1. An angular rate sensor comprises:
   a pair of driven tines and excitation means, responsive to an applied drive signal, for exciting a vibration of the driven tines, a pair of output tines coupled mechanically to the driven tines; and detection means responsive to a vibration of the output tines for generating a detection signal related to angular rate; means for generating a feedback signal related to torsional imbalance of the driven tines, and feedback means, responsive to the feedback signal, for driving the driven tines towards a condition of torsional balance.

2. An angular rate sensor according to claim 1 wherein said feedback signal is derived from a phase quadrature component of said detection signal.

3. An angular rate sensor according to claim 1 wherein the detection means comprises capacitance detection means for sensing capacitively the position of the driven tines in relation to a reference point or points on the angular rate sensor.

4. An angular rate sensor according to claim 1 including means arranged to inhibit operation of the feedback means whenever the ratio of the in-phase component of the detection signal to the phase-quadrature component of the detection signal exceeds a preset amount.

5. An angular rate sensor according to claim 1 wherein said excitation means includes an electrode arrangement for exciting the vibration of the driven tines and the sensor further includes switching means arranged to couple said electrode arrangement alternately to a source of said drive signal and to detection circuitry effective to generate an output related to a vibration of the driven tines as sensed by the electrode arrangement.

6. An angular rate sensor according to claim 5 including divider means arranged to receive the detection signal produced by said detection means and to receive a further signal indicative of the amplitude of vibration of the driven tines, and to effect a division of the detection signal by the further signal so as to provide a scaled detection signal related to angular rate.

7. An angular rate sensor comprises a single pair of tines, excitation means responsive to an applied drive signal for exciting a vibration of said tines; detection means responsive to a vibration of the tines for generating a detection signal related to angular rate; means for generating a feedback signal related to torsional imbalance of the tines; and feedback means, responsive to the feedback signal, for driving the tines towards a condition of torsional balance.

8. An angular rate sensor according to claim 7 wherein said feedback signal is derived from a phase quadrature component of said detection signal.

9. An angular rate sensor according to claim 7 wherein the detection means comprises capacitance detection means for sensing capacitively the position of the tines in relation to a reference point or points on the angular rate sensor.

10. An angular rate sensor according to claim 7 including means arranged to inhibit operation of the feedback means whenever the ratio of the in-phase component of the detection signal to the phase-quadrature component of the detection signal exceeds a preset amount.

11. An angular rate sensor according to claim 7 wherein said excitation means includes an electrode arrangement for exciting the vibration of the tines and the sensor further includes switching means arranged to couple said electrode arrangement alternately to a source of said drive signal and to detection circuitry effective to generate an output related to a vibration of the tines as sensed by the electrode arrangement.

12. An angular rate sensor according to claim 11 wherein the electrode arrangement is configured for exciting a vibration of the tines in a first direction and a further electrode arrangement is provided configured to detect vibration of the tines in a direction substantially orthogonal to the first direction, and wherein divider means is provided, arranged to receive signals from the said electrode arrangement and the said further electrode arrangement and for producing therefrom a scaled detection signal related to angular rate.

* * * * *